(12) United States Patent
Bareman

(10) Patent No.: US 10,735,638 B2
(45) Date of Patent: Aug. 4, 2020

(54) DUAL DISPLAY REVERSE CAMERA SYSTEM

(71) Applicant: Gentex Corporation, Zeeland, MI (US)

(72) Inventor: Donald L. Bareman, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/923,398

(22) Filed: Mar. 16, 2018

(65) Prior Publication Data

US 2018/0270406 A1 Sep. 20, 2018

Related U.S. Application Data

(60) Provisional application No. 62/472,815, filed on Mar. 17, 2017.

(51) Int. Cl.
*H04N 5/00* (2011.01)
*H04N 5/232* (2006.01)
(Continued)

(52) U.S. Cl.
CPC ........... *H04N 5/23203* (2013.01); *B60R 1/04* (2013.01); *B60R 1/12* (2013.01); *H04N 5/2258* (2013.01);
(Continued)

(58) Field of Classification Search
CPC .......... H04N 7/183; H04N 7/18; B60K 35/00; B60K 37/06; B60R 1/00; B60R 1/04;
(Continued)

(56) References Cited

U.S. PATENT DOCUMENTS 2,131,888 A 10/1938 Harris
2,632,040 A 3/1953 Rabinow
(Continued)

FOREIGN PATENT DOCUMENTS

DE 102015115362 A1 3/2017
EP 0513476 11/1992
(Continued)

OTHER PUBLICATIONS

International Searching Authority; International Search Report and Written Opinion of the International Searching Authority in International Patent Application No. PCT/US2018/022787; dated Jun. 28, 2018; 8 pages; Moscow, Russia.
(Continued)

*Primary Examiner* — Frank F Huang
(74) *Attorney, Agent, or Firm* — Price Heneveld LLP; Bradley D. Johnson

(57) ABSTRACT

A display system for a vehicle includes a first imager configured to capture image data in a field of view rearward of the vehicle. A second imager is also configured to capture image data in the field of view rearward of the vehicle. The display system additionally includes a first display device disposed in a passenger compartment of the vehicle and a second display device also disposed in the passenger compartment of the vehicle. The display system also includes a controller in communication with the first and second imagers and the first and second display devices wherein the controller is operable to adjust at least one of an orientation and a scale of two desired views of the image data for display on the first and second display devices.

12 Claims, 4 Drawing Sheets

(51) Int. Cl.
  *H04N 5/225* (2006.01)
  *B60R 1/04* (2006.01)
  *B60R 1/12* (2006.01)
  *H04N 7/18* (2006.01)
  *H04N 5/247* (2006.01)

(52) U.S. Cl.
  CPC ..... *H04N 5/23216* (2013.01); *H04N 5/23293* (2013.01); *H04N 7/181* (2013.01); *B60R 2001/1253* (2013.01); *B60R 2300/105* (2013.01); *B60R 2300/20* (2013.01); *B60R 2300/306* (2013.01); *B60R 2300/8046* (2013.01); *B60R 2300/8066* (2013.01); *H04N 5/23296* (2013.01); *H04N 5/247* (2013.01)

(58) Field of Classification Search
  CPC ......... B60R 1/06; B60R 1/12; B60R 11/0235; B60R 11/0247; B60R 11/04; B60R 21/01566; B60R 1/02; B60S 1/0822; B60S 1/0844; B60S 1/0885; G02B 27/01; G02B 27/0101; B60Q 3/258; B60Q 1/22; B60Q 1/2665; B60Q 1/503; B60Q 1/54; B60C 23/0408
  See application file for complete search history.

(56) References Cited

U.S. PATENT DOCUMENTS

| | | |
|---|---|---|
| 2,827,594 A | 3/1958 | Rabinow |
| 3,004,473 A | 10/1961 | Arthur et al. |
| 3,179,845 A | 4/1965 | Kulwiec |
| 3,581,276 A | 5/1971 | Newman |
| 3,663,819 A | 5/1972 | Hicks et al. |
| 4,109,235 A | 8/1978 | Bouthors |
| 4,139,801 A | 2/1979 | Linares |
| 4,151,526 A | 4/1979 | Hinachi et al. |
| 4,214,266 A | 7/1980 | Myers |
| 4,236,099 A | 11/1980 | Rosenblum |
| 4,257,703 A | 3/1981 | Goodrich |
| 4,258,979 A | 3/1981 | Mahin |
| 4,277,804 A | 7/1981 | Robison |
| 4,286,308 A | 8/1981 | Wolff |
| 4,310,851 A | 1/1982 | Pierrat |
| 4,357,558 A | 11/1982 | Massoni et al. |
| 4,376,909 A | 3/1983 | Tagami et al. |
| 4,479,173 A | 10/1984 | Rumpakis |
| 4,499,451 A | 2/1985 | Suzuki et al. |
| 4,599,544 A | 7/1986 | Martin |
| 4,638,287 A | 1/1987 | Umebayashi et al. |
| 4,645,975 A | 2/1987 | Meitzler et al. |
| 4,665,321 A | 5/1987 | Chang et al. |
| 4,665,430 A | 5/1987 | Hiroyasu |
| 4,692,798 A | 9/1987 | Seko et al. |
| 4,716,298 A | 12/1987 | Etoh |
| 4,727,290 A | 2/1988 | Smith et al. |
| 4,740,838 A | 4/1988 | Mase et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,910,591 A | 3/1990 | Petrossian et al. |
| 4,930,742 A | 6/1990 | Schofield et al. |
| 4,934,273 A | 6/1990 | Endriz |
| 4,967,319 A | 10/1990 | Seko |
| 5,005,213 A | 4/1991 | Hanson et al. |
| 5,008,946 A | 4/1991 | Ando |
| 5,027,200 A | 6/1991 | Petrossian et al. |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,197,562 A | 3/1993 | Kakinami et al. |
| 5,230,400 A | 7/1993 | Kakainami et al. |
| 5,235,178 A | 8/1993 | Hegyi |
| 5,243,417 A | 9/1993 | Pollard |
| 5,289,321 A * | 2/1994 | Secor ............... B60K 35/00 348/118 |
| 5,296,924 A | 3/1994 | Blancard et al. |
| 5,304,980 A | 4/1994 | Maekawa |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,386,285 A | 1/1995 | Asayama |
| 5,396,054 A | 3/1995 | Krichever et al. |
| 5,402,170 A | 3/1995 | Parulski et al. |
| 5,408,357 A | 4/1995 | Beukema |
| 5,414,461 A | 5/1995 | Kishi et al. |
| 5,416,318 A | 5/1995 | Hegyi |
| 5,418,610 A | 5/1995 | Fischer |
| 5,424,952 A | 6/1995 | Asayama |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,469,298 A | 11/1995 | Suman et al. |
| 5,471,515 A | 11/1995 | Fossum et al. |
| 5,475,441 A | 12/1995 | Parulski et al. |
| 5,475,494 A | 12/1995 | Nishida et al. |
| 5,481,268 A | 1/1996 | Higgins |
| 5,483,346 A | 1/1996 | Butzer |
| 5,483,453 A | 1/1996 | Uemura et al. |
| 5,485,155 A | 1/1996 | Hibino |
| 5,485,378 A | 1/1996 | Franke et al. |
| 5,488,496 A | 1/1996 | Pine |
| 5,508,592 A | 4/1996 | Lapatovich et al. |
| 5,515,448 A | 5/1996 | Nishitani |
| 5,523,811 A | 6/1996 | Wada et al. |
| 5,530,421 A | 6/1996 | Marshall et al. |
| 5,535,144 A | 7/1996 | Kise |
| 5,537,003 A | 7/1996 | Bechtel et al. |
| 5,541,590 A | 7/1996 | Nishio |
| 5,541,724 A | 7/1996 | Hoashi |
| 5,550,677 A | 8/1996 | Schofield et al. |
| 5,554,912 A | 9/1996 | Thayer et al. |
| 5,574,443 A | 11/1996 | Hsieh |
| 5,574,463 A | 11/1996 | Shirai et al. |
| 5,576,975 A | 11/1996 | Sasaki et al. |
| 5,587,929 A | 12/1996 | League et al. |
| 5,592,146 A | 1/1997 | Kover, Jr. et al. |
| 5,602,542 A | 2/1997 | Windmann et al. |
| 5,614,788 A | 3/1997 | Mullins et al. |
| 5,615,023 A | 3/1997 | Yang |
| 5,617,085 A | 4/1997 | Tsutsumi et al. |
| 5,621,460 A | 4/1997 | Hatlestad et al. |
| 5,634,709 A | 6/1997 | Iwama |
| 5,642,238 A | 6/1997 | Sala |
| 5,646,614 A | 7/1997 | Abersfelder et al. |
| 5,650,765 A | 7/1997 | Park |
| 5,660,454 A | 8/1997 | Mori et al. |
| 5,666,028 A | 9/1997 | Bechtel et al. |
| 5,670,935 A | 9/1997 | Schofield et al. |
| 5,680,123 A | 10/1997 | Lee |
| 5,684,473 A | 11/1997 | Hibino et al. |
| 5,707,129 A | 1/1998 | Kobayashi |
| 5,708,410 A | 1/1998 | Blank et al. |
| 5,708,857 A | 1/1998 | Ishibashi |
| 5,710,565 A | 1/1998 | Shirai et al. |
| 5,714,751 A | 2/1998 | Chen |
| 5,715,093 A | 2/1998 | Schierbeek et al. |
| 5,729,194 A | 3/1998 | Spears et al. |
| 5,736,816 A | 4/1998 | Strenke et al. |
| 5,745,050 A | 4/1998 | Nakagawa |
| 5,751,211 A | 5/1998 | Shirai et al. |
| 5,751,832 A | 5/1998 | Panter et al. |
| 5,754,099 A | 5/1998 | Nishimura et al. |

(56) References Cited

U.S. PATENT DOCUMENTS

| | | |
|---|---|---|
| 5,760,828 A | 6/1998 | Cortes |
| 5,764,139 A | 6/1998 | Nojima et al. |
| 5,767,793 A | 6/1998 | Agravante et al. |
| 5,781,105 A | 7/1998 | Bitar et al. |
| 5,786,787 A | 7/1998 | Eriksson et al. |
| 5,793,308 A | 8/1998 | Rosinski et al. |
| 5,793,420 A | 8/1998 | Schmidt |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,844,505 A | 12/1998 | Van Ryzin |
| 5,845,000 A | 12/1998 | Breed et al. |
| 5,850,176 A | 12/1998 | Kinoshita et al. |
| 5,867,214 A | 2/1999 | Anderson et al. |
| 5,877,897 A | 3/1999 | Schofield et al. |
| 5,883,739 A | 3/1999 | Ashihara et al. |
| 5,904,729 A | 5/1999 | Ruzicka |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,940,011 A | 8/1999 | Agravante et al. |
| 5,942,853 A | 8/1999 | Piscart |
| 5,949,331 A | 9/1999 | Schofield et al. |
| 5,956,079 A | 9/1999 | Ridgley |
| 5,956,181 A | 9/1999 | Lin |
| 5,959,555 A | 9/1999 | Furuta |
| 5,978,017 A * | 11/1999 | Tino .................. B60Q 1/52 348/148 |
| 5,990,469 A | 11/1999 | Bechtel et al. |
| 6,008,486 A | 12/1999 | Stam et al. |
| 6,009,359 A | 12/1999 | El-Hakim et al. |
| 6,018,308 A | 1/2000 | Shirai |
| 6,025,872 A | 2/2000 | Ozaki et al. |
| 6,046,766 A | 4/2000 | Sakata |
| 6,049,171 A | 4/2000 | Stam et al. |
| 6,060,989 A | 5/2000 | Gehlot |
| 6,061,002 A | 5/2000 | Weber et al. |
| 6,067,111 A | 5/2000 | Hahn et al. |
| 6,072,391 A | 6/2000 | Suzuki et al. |
| 6,078,355 A | 6/2000 | Zengel |
| 6,097,023 A | 8/2000 | Schofield et al. |
| 6,102,546 A | 8/2000 | Carter |
| 6,106,121 A | 8/2000 | Buckley et al. |
| 6,111,498 A | 8/2000 | Jobes et al. |
| 6,115,651 A | 9/2000 | Cruz |
| 6,122,597 A | 9/2000 | Saneyoshi et al. |
| 6,128,576 A | 10/2000 | Nishimoto et al. |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,151,065 A | 11/2000 | Steed et al. |
| 6,151,539 A | 11/2000 | Bergholz et al. |
| 6,154,149 A | 11/2000 | Tychkowski et al. |
| 6,157,294 A | 12/2000 | Urai et al. |
| 6,166,629 A | 12/2000 | Andreas |
| 6,166,698 A | 12/2000 | Turnbull et al. |
| 6,167,755 B1 | 1/2001 | Damson et al. |
| 6,172,600 B1 | 1/2001 | Kakinami et al. |
| 6,172,601 B1 | 1/2001 | Wada et al. |
| 6,175,300 B1 | 1/2001 | Kendrick |
| 6,184,781 B1 | 2/2001 | Ramakesavan |
| 6,185,492 B1 | 2/2001 | Kagawa et al. |
| 6,191,704 B1 | 2/2001 | Takenaga et al. |
| 6,200,010 B1 | 3/2001 | Anders |
| 6,218,934 B1 | 4/2001 | Regan |
| 6,222,447 B1 | 4/2001 | Schofield et al. |
| 6,249,214 B1 | 6/2001 | Kashiwazaki |
| 6,250,766 B1 | 6/2001 | Strumolo et al. |
| 6,255,639 B1 | 7/2001 | Stam et al. |
| 6,259,475 B1 | 7/2001 | Ramachandran |
| 6,265,968 B1 | 7/2001 | Betzitza et al. |
| 6,268,803 B1 | 7/2001 | Gunderson et al. |
| 6,269,308 B1 | 7/2001 | Kodaka et al. |
| 6,281,632 B1 | 8/2001 | Stam et al. |
| 6,281,804 B1 | 8/2001 | Haller et al. |
| 6,289,332 B2 | 9/2001 | Menig et al. |
| 6,300,879 B1 | 10/2001 | Regan et al. |
| 6,304,173 B2 | 10/2001 | Pala et al. |
| 6,317,057 B1 | 11/2001 | Lee |
| 6,320,612 B1 | 11/2001 | Young |
| 6,324,295 B1 | 11/2001 | Avionique et al. |
| 6,329,925 B1 | 12/2001 | Skiver et al. |
| 6,330,511 B2 | 12/2001 | Ogura et al. |
| 6,335,680 B1 | 1/2002 | Matsuoka |
| 6,344,805 B1 | 2/2002 | Yasui et al. |
| 6,348,858 B2 | 2/2002 | Weis et al. |
| 6,349,782 B1 | 2/2002 | Sekiya et al. |
| 6,356,206 B1 | 3/2002 | Takenaga et al. |
| 6,356,376 B1 | 3/2002 | Tonar et al. |
| 6,357,883 B1 | 3/2002 | Strumolo et al. |
| 6,363,326 B1 | 3/2002 | Scully |
| 6,369,701 B1 | 4/2002 | Yoshida et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,408,247 B1 | 6/2002 | Ichikawa et al. |
| 6,412,959 B1 | 7/2002 | Tseng |
| 6,415,230 B1 | 7/2002 | Maruko et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,892 B1 | 7/2002 | Matsuoka |
| 6,428,172 B1 | 8/2002 | Hutzel et al. |
| 6,433,680 B1 | 8/2002 | Ho |
| 6,437,688 B1 | 8/2002 | Kobayashi |
| 6,438,491 B1 | 8/2002 | Farmer |
| 6,441,872 B1 | 8/2002 | Ho |
| 6,442,465 B2 | 8/2002 | Breed et al. |
| 6,443,602 B1 | 9/2002 | Tanabe et al. |
| 6,447,128 B1 | 9/2002 | Lang et al. |
| 6,452,533 B1 | 9/2002 | Yamabuchi et al. |
| 6,463,369 B2 | 10/2002 | Sadano et al. |
| 6,465,962 B1 | 10/2002 | Fu et al. |
| 6,466,701 B1 | 10/2002 | Ejiri et al. |
| 6,469,739 B1 | 10/2002 | Bechtel et al. |
| 6,472,977 B1 | 10/2002 | Pochmuller |
| 6,473,001 B1 | 10/2002 | Blum |
| 6,476,731 B1 | 11/2002 | Miki et al. |
| 6,476,855 B1 | 11/2002 | Yamamoto |
| 6,483,429 B1 | 11/2002 | Yasui et al. |
| 6,483,438 B2 | 11/2002 | Deline et al. |
| 6,487,500 B2 | 11/2002 | Lemelson et al. |
| 6,491,416 B1 | 12/2002 | Strazzanti |
| 6,498,620 B2 | 12/2002 | Schofield et al. |
| 6,501,387 B2 | 12/2002 | Skiver et al. |
| 6,507,779 B2 | 1/2003 | Breed et al. |
| 6,515,581 B1 | 2/2003 | Ho |
| 6,515,597 B1 | 2/2003 | Wada et al. |
| 6,520,667 B1 | 2/2003 | Mousseau |
| 6,522,969 B2 | 2/2003 | Kannonji |
| 6,542,085 B1 | 4/2003 | Yang |
| 6,542,182 B1 | 4/2003 | Chutorash |
| 6,545,598 B1 | 4/2003 | De Villeroche |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,761 B1 | 5/2003 | Miller et al. |
| 6,572,233 B1 | 6/2003 | Northman et al. |
| 6,580,373 B1 | 6/2003 | Ohashi |
| 6,581,007 B2 | 6/2003 | Hasegawa et al. |
| 6,583,730 B2 | 6/2003 | Lang et al. |
| 6,575,643 B2 | 7/2003 | Takahashi |
| 6,587,573 B1 | 7/2003 | Stam et al. |
| 6,591,192 B2 | 7/2003 | Okamura et al. |
| 6,594,583 B2 | 7/2003 | Ogura et al. |
| 6,594,614 B2 | 7/2003 | Studt et al. |
| 6,611,202 B2 | 8/2003 | Schofield et al. |
| 6,611,227 B1 | 8/2003 | Nebiyeloul-Kifle |

(56) References Cited

U.S. PATENT DOCUMENTS

| | | |
|---|---|---|
| 6,611,610 B1 | 8/2003 | Stam et al. |
| 6,611,759 B2 | 8/2003 | Brosche |
| 6,614,387 B1 | 9/2003 | Deadman |
| 6,616,764 B2 | 9/2003 | Kramer et al. |
| 6,617,564 B2 | 9/2003 | Ockerse et al. |
| 6,618,672 B2 | 9/2003 | Sasaki et al. |
| 6,630,888 B2 | 10/2003 | Lang et al. |
| 6,631,316 B2 | 10/2003 | Stam et al. |
| 6,636,258 B2 | 10/2003 | Strumolo |
| 6,642,840 B2 | 11/2003 | Lang et al. |
| 6,642,851 B2 | 11/2003 | Deline et al. |
| 6,648,477 B2 | 11/2003 | Hutzel et al. |
| 6,665,592 B2 | 12/2003 | Kodama |
| 6,670,207 B1 | 12/2003 | Roberts |
| 6,670,910 B2 | 12/2003 | Delcheccolo et al. |
| 6,674,370 B2 | 1/2004 | Rodewald et al. |
| 6,675,075 B1 | 1/2004 | Engelsberg et al. |
| 6,677,986 B1 | 1/2004 | Pöchmüller |
| 6,683,539 B2 | 1/2004 | Trajkovic et al. |
| 6,683,969 B1 | 1/2004 | Nishigaki et al. |
| 6,690,268 B2 | 2/2004 | Schofield et al. |
| 6,690,413 B1 | 2/2004 | Moore |
| 6,693,517 B2 | 2/2004 | McCarty et al. |
| 6,693,518 B2 | 2/2004 | Kumata |
| 6,693,519 B2 | 2/2004 | Keirstead |
| 6,693,524 B1 | 2/2004 | Payne |
| 6,717,610 B1 | 4/2004 | Bos et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,737,964 B2 | 5/2004 | Samman et al. |
| 6,738,088 B1 | 5/2004 | Uskolovsky et al. |
| 6,744,353 B2 | 6/2004 | Sjonell |
| 6,772,057 B2 | 8/2004 | Breed et al. |
| 6,774,988 B2 | 8/2004 | Stam et al. |
| 6,846,098 B2 | 1/2005 | Bourdelais et al. |
| 6,847,487 B2 | 1/2005 | Burgner |
| 6,861,809 B2 | 3/2005 | Stam |
| 6,902,307 B2 | 6/2005 | Strazzanti |
| 6,912,001 B2 | 6/2005 | Okamoto et al. |
| 6,913,375 B2 | 7/2005 | Strazzanti |
| 6,923,080 B1 | 8/2005 | Dobler et al. |
| 6,930,737 B2 | 8/2005 | Weindorf et al. |
| 6,946,978 B2 | 9/2005 | Schofield |
| 7,012,543 B2 | 3/2006 | Deline et al. |
| 7,038,577 B2 | 5/2006 | Pawlicki et al. |
| 7,046,448 B2 | 5/2006 | Burgner |
| 7,175,291 B1 | 2/2007 | Li |
| 7,255,465 B2 | 8/2007 | Deline et al. |
| 7,262,406 B2 | 8/2007 | Heslin et al. |
| 7,265,342 B2 | 9/2007 | Heslin et al. |
| 7,292,208 B1 | 11/2007 | Park et al. |
| 7,311,428 B2 | 12/2007 | Deline et al. |
| 7,321,112 B2 | 1/2008 | Stam et al. |
| 7,417,221 B2 | 8/2008 | Creswick et al. |
| 7,446,650 B2 | 11/2008 | Scholfield et al. |
| 7,467,883 B2 | 12/2008 | Deline et al. |
| 7,468,651 B2 | 12/2008 | Deline et al. |
| 7,505,047 B2 | 3/2009 | Yoshimura |
| 7,533,998 B2 | 5/2009 | Schofield et al. |
| 7,548,291 B2 | 6/2009 | Lee et al. |
| 7,565,006 B2 | 7/2009 | Stam et al. |
| 7,567,291 B2 | 7/2009 | Bechtel et al. |
| 7,579,940 B2 | 8/2009 | Schofield et al. |
| 7,583,184 B2 * | 9/2009 | Schofield ............... B60C 23/00 340/438 |
| 7,653,215 B2 | 1/2010 | Stam |
| 7,658,521 B2 | 2/2010 | Deline et al. |
| 7,683,326 B2 | 3/2010 | Stam et al. |
| 7,711,479 B2 | 5/2010 | Taylor et al. |
| 7,719,408 B2 | 5/2010 | Deward et al. |
| 7,720,580 B2 | 5/2010 | Higgins-Luthman |
| 7,815,326 B2 | 10/2010 | Blank et al. |
| 7,825,951 B2 * | 11/2010 | Lang ........................ B60R 1/12 340/438 |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,031,225 B2 | 10/2011 | Watanabe et al. |
| 8,045,760 B2 | 10/2011 | Stam et al. |
| 8,059,235 B2 | 11/2011 | Utsumi et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,144,033 B2 * | 3/2012 | Chinomi ................. B60R 1/00 340/434 |
| 8,162,518 B2 | 4/2012 | Schofield |
| 8,201,800 B2 | 6/2012 | Filipiak |
| 8,203,433 B2 | 6/2012 | Deuber et al. |
| 8,217,830 B2 | 7/2012 | Lynam |
| 8,222,588 B2 | 7/2012 | Schofield et al. |
| 8,258,433 B2 | 9/2012 | Byers et al. |
| 8,282,226 B2 | 10/2012 | Blank et al. |
| 8,305,204 B2 * | 11/2012 | Nagamine ............. B60Q 9/005 340/435 |
| 8,325,028 B2 | 12/2012 | Schofield et al. |
| 8,482,683 B2 | 7/2013 | Hwang et al. |
| 9,041,806 B2 * | 5/2015 | Baur ....................... B60R 1/00 348/148 |
| 2001/0019356 A1 | 9/2001 | Takeda et al. |
| 2001/0022616 A1 | 9/2001 | Rademacher et al. |
| 2001/0026316 A1 | 10/2001 | Senatore |
| 2001/0045981 A1 | 11/2001 | Gloger et al. |
| 2002/0040962 A1 | 4/2002 | Schofield et al. |
| 2002/0044065 A1 | 4/2002 | Quist et al. |
| 2002/0191127 A1 | 12/2002 | Roberts et al. |
| 2003/0002165 A1 | 1/2003 | Mathias et al. |
| 2003/0007261 A1 | 1/2003 | Hutzel et al. |
| 2003/0016125 A1 | 1/2003 | Lang et al. |
| 2003/0016287 A1 | 1/2003 | Nakayama et al. |
| 2003/0025596 A1 | 2/2003 | Lang et al. |
| 2003/0025597 A1 | 2/2003 | Schofield |
| 2003/0030546 A1 | 2/2003 | Tseng |
| 2003/0030551 A1 | 2/2003 | Ho |
| 2003/0030724 A1 | 2/2003 | Okamoto |
| 2003/0035050 A1 | 2/2003 | Mizusawa |
| 2003/0043269 A1 | 3/2003 | Park |
| 2003/0052969 A1 | 3/2003 | Satoh et al. |
| 2003/0058338 A1 | 3/2003 | Kawauchi et al. |
| 2003/0067383 A1 | 4/2003 | Yang |
| 2003/0076415 A1 | 4/2003 | Strumolo |
| 2003/0080877 A1 | 5/2003 | Takagi et al. |
| 2003/0085806 A1 | 5/2003 | Samman et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0098908 A1 | 5/2003 | Misaiji et al. |
| 2003/0103141 A1 | 6/2003 | Bechtel et al. |
| 2003/0103142 A1 | 6/2003 | Hitomi et al. |
| 2003/0117522 A1 | 6/2003 | Okada |
| 2003/0122929 A1 | 7/2003 | Minaudo et al. |
| 2003/0122930 A1 | 7/2003 | Schofield et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0169158 A1 | 9/2003 | Paul, Jr. |
| 2003/0179293 A1 | 9/2003 | Dizumi |
| 2003/0202096 A1 | 10/2003 | Kim |
| 2003/0202357 A1 | 10/2003 | Strazzanti |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |

(56) References Cited

U.S. PATENT DOCUMENTS

| | | |
|---|---|---|
| 2003/0227546 A1 | 12/2003 | Hilborn et al. |
| 2004/0004541 A1 | 1/2004 | Hong |
| 2004/0027695 A1 | 1/2004 | Lin |
| 2004/0032321 A1 | 2/2004 | McMahon et al. |
| 2004/0036768 A1 | 2/2004 | Green |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0080404 A1 | 4/2004 | White |
| 2004/0080431 A1 | 4/2004 | White |
| 2004/0085196 A1 | 5/2004 | Milelr et al. |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0107030 A1 | 6/2004 | Nishira et al. |
| 2004/0107617 A1 | 6/2004 | Shoen et al. |
| 2004/0109060 A1 | 6/2004 | Ishii |
| 2004/0114039 A1 | 6/2004 | Ishikura |
| 2004/0119668 A1 | 6/2004 | Homma et al. |
| 2004/0125905 A1 | 7/2004 | Vlasenko et al. |
| 2004/0202001 A1 | 10/2004 | Roberts et al. |
| 2005/0140855 A1 | 6/2005 | Utsumi |
| 2005/0237440 A1 | 10/2005 | Sugimura et al. |
| 2006/0007550 A1 | 1/2006 | Tonar et al. |
| 2006/0115759 A1 | 6/2006 | Kim et al. |
| 2006/0139953 A1 | 6/2006 | Chou et al. |
| 2006/0147264 A1* | 7/2006 | Doran, Jr. ............... E01F 9/70 404/73 |
| 2006/0158899 A1 | 7/2006 | Ayabe et al. |
| 2007/0171037 A1 | 7/2007 | Schofield et al. |
| 2008/0068520 A1 | 3/2008 | Minikey, Jr. et al. |
| 2008/0192132 A1 | 8/2008 | Bechtel et al. |
| 2008/0225538 A1* | 9/2008 | Lynam ................ B60K 35/00 362/494 |
| 2008/0247192 A1 | 10/2008 | Hoshi et al. |
| 2008/0294315 A1 | 11/2008 | Breed |
| 2009/0015736 A1 | 1/2009 | Weller et al. |
| 2009/0141516 A1 | 6/2009 | Wu et al. |
| 2010/0201896 A1 | 8/2010 | Ostreko et al. |
| 2012/0086808 A1* | 4/2012 | Lynam ................ B60K 35/00 348/148 |
| 2013/0028473 A1 | 1/2013 | Hilldore et al. |
| 2013/0147953 A1* | 6/2013 | Rao ..................... B60R 1/00 348/148 |
| 2013/0265431 A1* | 10/2013 | Hattori ................. H04N 7/18 348/148 |
| 2013/0279014 A1 | 10/2013 | Fish, Jr. et al. |
| 2014/0347488 A1 | 11/2014 | Tazaki et al. |
| 2017/0343799 A1* | 11/2017 | Ito ...................... G02B 27/0093 |

FOREIGN PATENT DOCUMENTS

| | | |
|---|---|---|
| EP | 0513476 A1 | 11/1992 |
| GB | 2338363 | 12/1999 |
| JP | 1178693 | 3/1999 |
| JP | 2005148119 | 6/2005 |
| JP | 2005327600 | 11/2005 |
| JP | 2008139819 A | 6/2008 |
| JP | 2017054478 A | 3/2017 |
| KR | 2010009058 A | 8/2010 |
| KR | 1020090010208 A | 8/2010 |
| WO | 9621581 | 7/1996 |
| WO | 2007103573 A2 | 9/2007 |
| WO | 2010090964 | 8/2010 |
| WO | 2013084622 A1 | 6/2013 |
| WO | 2016024395 A1 | 2/2016 |

OTHER PUBLICATIONS

Palalau et al., "FPD Evaluation for Automotive Application," Proceedings of the Vehicle Display Symposium, Nov. 2, 1995, pp. 97-103, Society for Information Display, Detroit Chapter, Santa Ana, CA.

Adler, "A New Automotive AMLCD Module," Proceedings of the Vehicle Display Symposium, Nov. 2, 1995, pp. 67-71, Society for Information Display, Detroit Chapter, Santa Ana, CA.

Sayer, et al., "In-Vehicle Displays for Crash Avoidance and Navigation Systems,"Proceedings of the Vehicle Display Symposium, Sep. 18, 1996, pp. 39-42, Society for Information Display, Detroit Chapter, Santa Ana, CA.

Knoll, et al., "Application of Graphic Displays in Automobiles," SID 87 Digest, 1987, pp. 41-44, 5A.2.

Terada, et al., "Development of Central Information Display of Automotive Application," SID 89 Digest, 1989, pp. 192-195, Society for Information Display, Detroit Center, Santa Ana, CA.

Thomsen, et al, "AMLCD Design Considerations for Avionics and Vetronics Applications," Proceedings of the 5th Annual Flat Panel Display Strategic and Technical Symposium, Sep. 9-10, 1998, pp. 139-145, Society for Information Display, Metropolitan Detroit Chapter, CA.

Knoll, et al., "Conception of an Integrated Driver Information System," SID International Symposium Digest of Technical Papers, 1990, pp. 126-129, Society for Information Display, Detroit Center, Santa Ana, CA.

Vincen, "An Analysis of Direct-View FPDs for Automotive Multi-Media Applications,"Proceedings of the 6th Annual Strategic and Technical Symposium "Vehicular Applications of Displays and Microsensors," Sep. 22-23, 1999, pp. 39-46, Society for Information Display, Metropolitan Detroit Chapter, San Jose, CA.

Zuk, et al., "Flat Panel Display Applications in Agriculture Equipment," Proceedings of the 5th Annual Flat Panel Display Strategic and Technical Symposium, Sep. 9-10, 1998, pp. 125-130, Society for Information Display, Metropolitan Detroit Chapter, CA.

Vijan, et al., "A 1.7-Mpixel Full-Color Diode Driven AM-LCD," SID International Symposium, 1990, pp. 530-533, Society for Information Display, Playa del Rey, CA.

Vincen, "The Automotive Challenge to Active Matrix LCD Technology," Proceedings of the Vehicle Display Symposium, 1996, pp. 17-21, Society for Information Display, Detroit Center, Santa Ana, CA.

Corsi, et al., "Reconfigurable Displays Used as Primary Automotive Instrumentation," SAE Technical Paper Series, 1989, pp. 13-18, Society of Automotive Engineers, Inc., Warrendale, PA.

Schumacher, "Automotive Display Trends," SID 96 Digest, 1997, pp. 1-6, Delco Electronics Corp., Kokomo, IN.

Knoll, "The Use of Displays in Automotive Applications," Journal of the SID 5/3 1997, pp. 165-172, 315-316, Stuttgart, Germany.

Donofrio, "Looking Beyond the Dashboard," SID 2002, pp. 30-34, Ann Arbor, MI.

Stone, "Automotive Display Specification," Proceedings of the Vehicle Display Symposium, 1995, pp. 93-96, Society or Information Display, Detroit Center, Santa Ana, CA.

* cited by examiner

DUAL DISPLAY REVERSE CAMERA SYSTEM

CROSS REFERENCE TO RELATED APPLICATION

This application claims priority under 35 U.S.C. § 119(e) to the U.S. Provisional Application No. 62/472,815, filed on Mar. 17, 2017, entitled "DUAL DISPLAY REVERSE CAMERA SYSTEM," the entire disclosure of which is hereby incorporated herein by reference in its entirety.

TECHNOLOGICAL FIELD

The present disclosure relates generally to a display system for a vehicle and more particularly, to a display system providing a rearward view from the vehicle.

SUMMARY

According to one aspect of the present disclosure, a display system for a vehicle is provided. The display system includes a first imager configured to capture image data in a field of view rearward of the vehicle, a second imager configured to capture image data in the field of view rearward of the vehicle, and a first display device disposed in a passenger compartment of the vehicle. The display system further includes a second display device disposed in the passenger compartment of the vehicle and a controller in communication with the first and second imagers and the first and second display devices wherein the controller produces two desired views of the image data for display on the first and second display devices.

According to another aspect of the present disclosure, a method for simultaneously displaying two desired views of image data is provided. The method includes capturing image data in a field of view rearward of the vehicle using a first imager, capturing image data in the field of view rearward of the vehicle using a second imager, processing the image data captured from the first and second imagers, and displaying the two desired views on a first and a second display device.

According to yet another aspect of the present disclosure, an apparatus for displaying a rearward directed field of view for a vehicle is provided. The apparatus includes a display device disposed in a passenger compartment of the vehicle, the display device comprising a first and a second screen and a controller in communication with the display device and a first imager and a second imager configured to capture image data in the rearward directed field of view, wherein the controller is operable to process the image data and produce the two desired views of the image data.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION OF EMBODIMENTS

Figure 1:
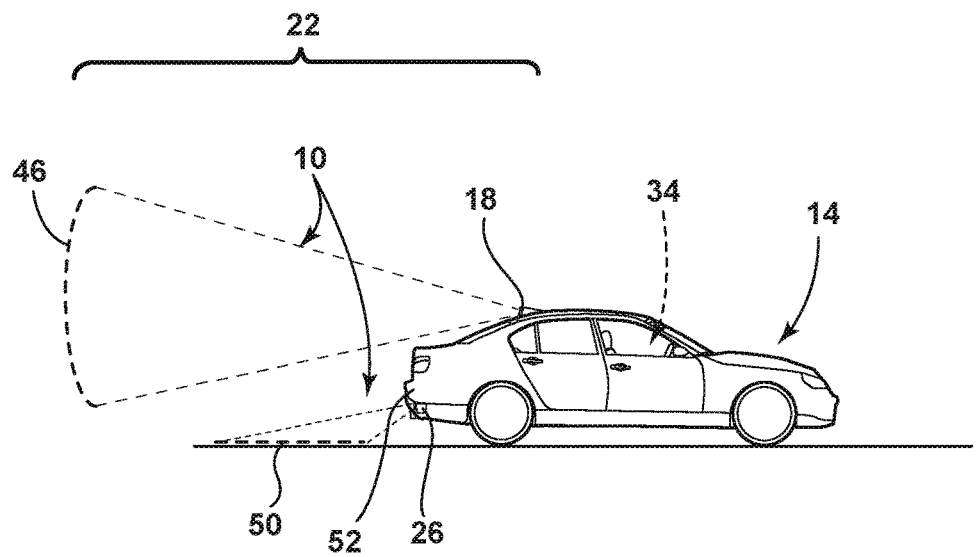
FIG. 1 is a side view of a vehicle including a display system according to some embodiments of the present disclosure.

The present illustrated embodiments reside primarily in combinations of method steps and apparatus components related to an image center system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-4, a display system 10 is shown for a vehicle 14. The display system 10 includes a first imager 18 configured to capture image data in a field of view 22 rearward of the vehicle 14. A second imager 26 is also configured to capture image data in the field of view 22 rearward of the vehicle 14. The display system 10 additionally includes a first display device 30 disposed in a passenger compartment 34 of the vehicle 14 and a second display device 38 also disposed in the passenger compartment 34 of the vehicle 14. The display system 10 also includes a controller 42 in communication with the first and second imagers 18, 26 and the first and second display devices 30, 38 wherein the controller 42 is operable to produce two desired views of the image data for display on the first and second display devices 30, 38.

The first and second display devices 30, 38 may correspond to a rearview display device configured to provide a rearward directed view relative to the vehicle 14. In this configuration, the display system 10 is operable to display a series of images captured corresponding to the field of view 22 behind the vehicle 14. The first and second imagers 18, 26 are in communication with the controller 42 and include a pixel array configured to capture the image data in the form of pixel information. In the various implementations discussed herein, the display system 10 is configured to process the image data captured by the first and second imagers 18, 26 and apply at least one image analysis technique to identify and display the at least two desired views of the image data.

The first and second imagers 18, 26 may be integrated or in connection with a side view mirror, a rearview display device, a rear windshield, a front windshield, a door, a bumper, a rear deck-lid (trunk), a paneling member, or various other portions of the vehicle 14 as desired to produce the desired image for a particular application. In some embodiments, the first display device 30 can be a rearview mirror display device 74 (shown in FIG. 3B). In other embodiments, the first display device 30 can be a rearview display device. In some embodiments, the second display device 38 is a dash display device 78 (shown in FIG. 3B). In other embodiments, the first and second display devices 30, 38 may both be positioned in a rearview mirror display device. In still other embodiments, the first and second display devices 30, 38 may both be positioned in a dash display device.

Figure 4:
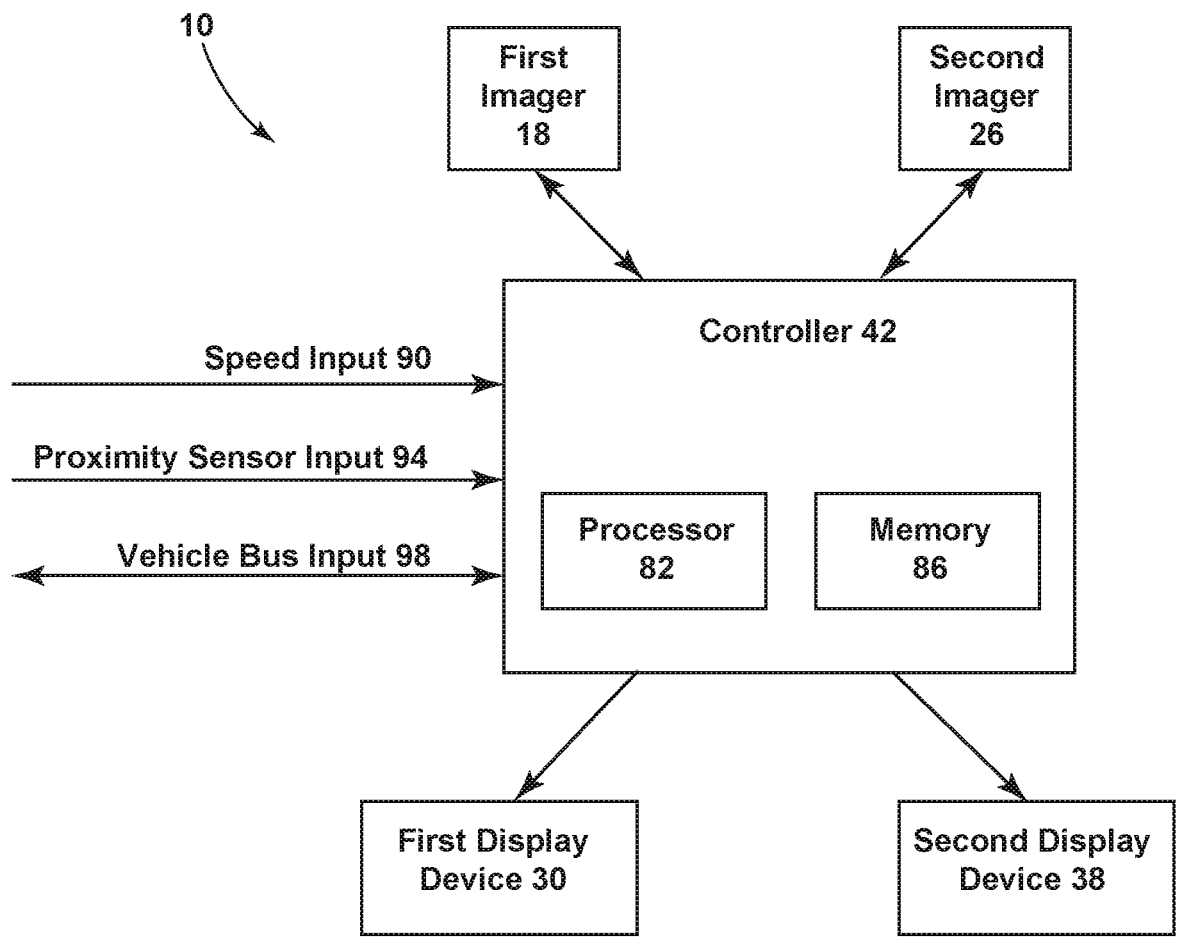
FIG. 4 is a block diagram of the display system according to some embodiments of the present disclosure.

In some embodiments, one or more supplemental imagers (not shown) may be configured to capture image data in a field of view complementary and/or different from the field of view rearward of the vehicle. One of the advantages of using additional imagers in combination with the first and second imagers 18, 26 is the ability to expand the field of view under surveillance or consideration by the user and/or occupants. For example, the ability to produce one or more better inclusive images from the data generated by the imagers as processed by the controller as shown in FIG. 4 would better allow the user to appreciate and maneuver through their surroundings. The one or more supplemental imagers may be positioned on or within a side view mirror, a rearview display device, a rear windshield, a front windshield, one or more doors, a bumper, a trunk, a paneling member, or combinations thereof.

In some embodiments, one or more supplemental display devices (not shown) may be disposed in the passenger compartment of the vehicle 14. In embodiments where additional supplemental display devices are used, they may be used to complement or provide different display views of the surrounding environment. In some embodiments, each imager 18, 26 may be displayed on its own display device 30, 38 to provide the user with separate views of different images. In some embodiments, one or more imagers may capture image data in the field of view 22 that may be combined or cropped to provide one or more images that may be displayed on the one or more display devices. In some embodiments, the controller 42 in communication with three imagers and three display devices may produce three desired views of the image data on the three display devices. In some embodiments, the controller 42 in communication with three imagers and two display devices may produce two desired views of the image data on the two display devices. In still other embodiments, the controller 42 in communication with four or more imagers and two display devices may produce two desired views of the image data on the two display devices. In other embodiments, one or two display devices may be used to provide image data for one, two, three, four, or more views.

The use and activation of the first and second imagers 18, 26 and the corresponding first and second display devices 30, 38 may vary depending on the application or the preferences of the user. In some embodiments, the desired views of the image data displayed on the respective first and second display devices 30, 38 may be triggered or activated when the vehicle 14 is put into reverse to back the vehicle 14 up. In other embodiments, the desired views of the image data displayed on the respective first and second display devices 30, 38 may be triggered or activated when the vehicle 14 is put into drive to move the vehicle 14 forward. In still other embodiments, the desired views of the image data displayed on the respective first and second display devices 30, 38 may be triggered or activated through an interface on the vehicle for the user to interact with. The use of the display system 10 can be variable and may depend, for example, on the preferences of the user or as required by certain state or federal regulations. In some embodiments, the desired views of the image data displayed on the respective first and second display devices 30, 38 may be changed or manipulated based on the surrounding environment of the vehicle 14. For example, the field of view 22 of the display system 10 may be shifted or adjusted based on the steering wheel position or if the vehicle 14 is in drive or reverse.

Referring to FIG. 1, the side view of the vehicle 14 is shown illustrating the field of view 22 being imaged by the display system 10 in some embodiments. The first imager 18 captures image data from the field of view 22 to provide a long view image 46 as a first desired view. The second imager 26 captures image data from the field of view 22 to provide a short wide angle view image 50 as a second desired view. In some embodiments, the first imager 18 may be positioned in the passenger compartment 34 and the second imager 26 may be positioned on or in a rear bumper 52 of the vehicle 14. In some embodiments, the long view image 46 and the short wide angle view image 50 may partially overlap to provide a continuous view of the image data collected in the field of view 22. In other embodiments, the long view image 46 and the short wide angle view image 50 may not provide overlapping image data so the field of view 22 may offer different perspectives provided by the first and second imagers 18, 26. In still other embodiments, the one or more supplemental imagers (not shown) are configured to capture additional image data in a field of view complementary and/or supplemental from the field of view 22 rearward of the vehicle 14 to provide more inclusive and/or additional images.

Figure 2:
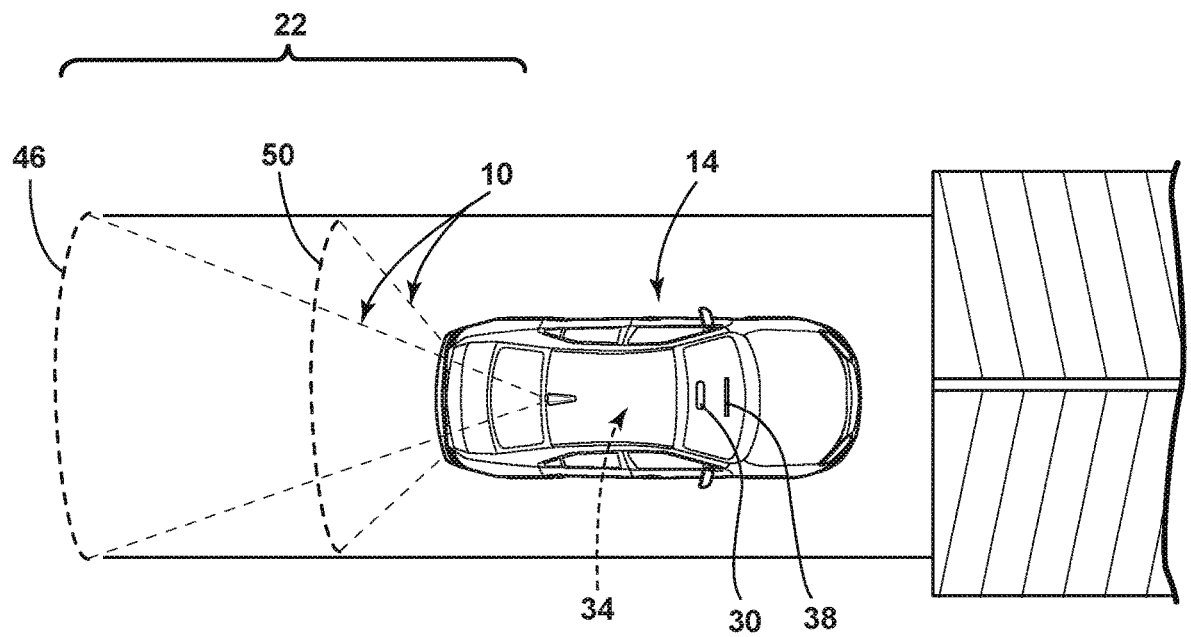
FIG. 2 is a top view of the vehicle of FIG. 1 including a display system according to some embodiments of the present disclosure.

Referring to FIG. 2, the top view of the vehicle 14 is shown illustrating the area imaged by the first imager 18 and the second imager 26 as shown in FIG. 1 in the field of view 22. As shown in FIG. 2, the long view image 46 projects into the region behind the vehicle 14 while the short wide angle view image 50 projects into the area located directly behind the rear bumper 52. In some embodiments, the long view image 46 may be displayed on the first display device 30 and the short wide angle view image 50 may be displayed on the second display device 38. In other embodiments, the long view image 46 may be displayed on the second display device 38 and the short wide angle view image 50 may be displayed on the first display device 30. In still other embodiments, a user may select whether the first display device 30 or the second display device 38 is used to display the long view image 46 or the short wide angle view image 50. The first display device 30 and the second display device 38 may both be positioned in the passenger compartment 34 of the vehicle 14 to be viewed by the user and/or occupants.

Although the embodiments disclosed herein provide for the first imager 18 and the second imager 26 to capture image data, the number of imagers is not meant to be limiting. In some embodiments, a third imager may additionally be coupled or positioned to the side view mirror, the rear windshield, the front windshield, one or more doors, the bumper, the trunk, or various other portions of the vehicle 14 to complement and/or add additional data to the image data captured by the first and second imagers 18, 26. The image data collected from additional third or supplemental imagers may be used to provide additional desired views to be displayed on additional display devices or may be shared or split with other desired views on existing display devices like the rearview mirror display device 74 and/or the dash display device 78 (both shown in FIG. 3B). In other embodiments, a single imager could capture image data represented a wide field of view 22 (low focal length) and the controller 42 as shown in FIG. 4 could be configured to crop different portions of the image data from the single imager and display two or more desired images on the first and second display devices 30, 38.

Figure 3A:
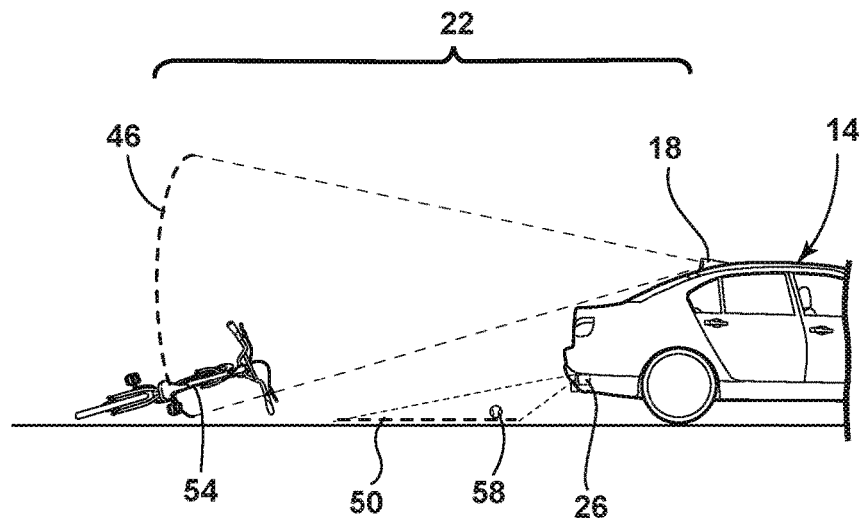
FIG. 3A is a side view of a vehicle including a display system imaging two different objects behind the vehicle according to some embodiments of the present disclosure.

Referring now to FIG. 3A, a side view of the vehicle 14 is shown illustrating the first imager 18 capturing image data of a first object 54 in the field of view 22 and the second imager 26 capturing image data of a second object 58 also in the field of view 22. The first object 54 can appear as the first desired view positioned in the long view image 46. The second object 58 can appear as the second desired view positioned in the short wide angle view image 50. The first and second objects 54, 58 are not meant to be limiting and in some embodiments a plurality of different objects could be captured in the image data collected by the respective imagers. Objects that could be detected by the first and/or second imagers 18, 26 include obstacles, vehicles, potholes, children, pets, etc.

Figure 3B:
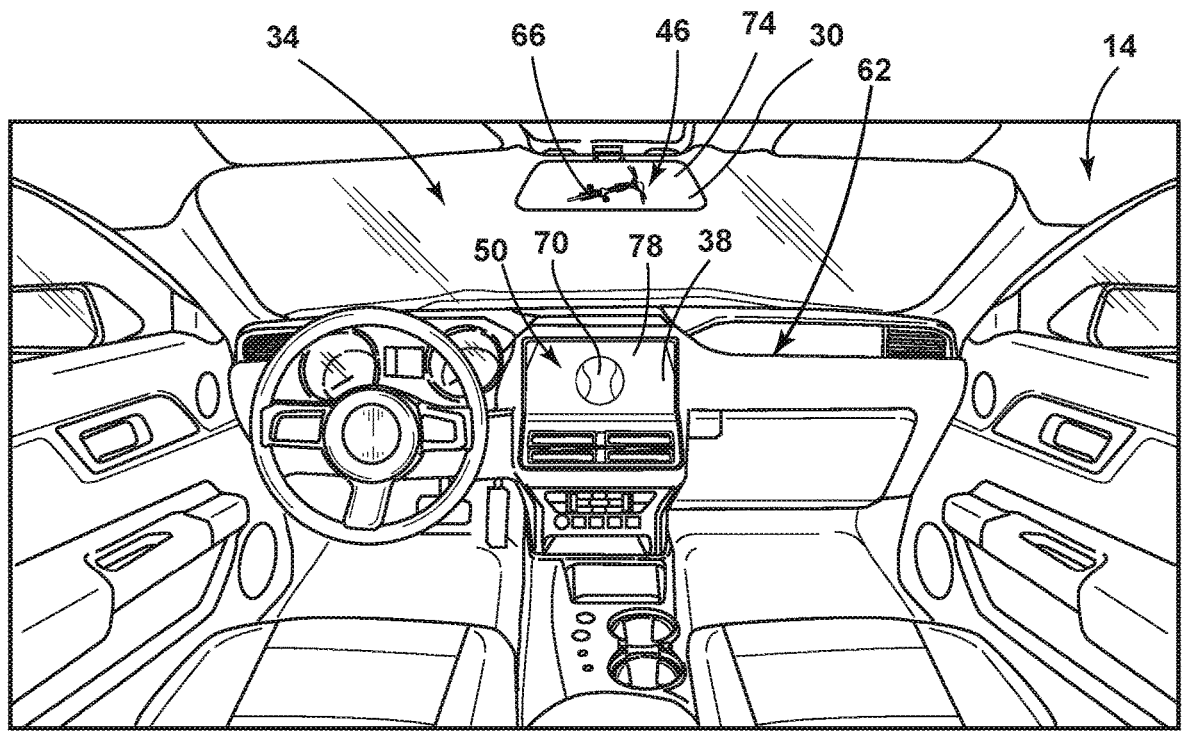
FIG. 3B is an isometric view of a dash of a vehicle in a passenger compartment according to some embodiments of the present disclosure.

Referring now to FIG. 3B, a front dash 62 is shown positioned in the passenger compartment 34 of the vehicle 14. Additionally shown in the passenger compartment 34 is the rearview mirror display device 74 used as the first display device 30. This first display device 30 displays the long view image 46 including a first object image 66 as shown in FIG. 3A. The second display device 38 includes the dash display device 78 displaying the short wide angle view image 50 including a second object image 70 as shown in FIG. 3A. The objects imaged in the first and second display devices 30, 38 may change as the vehicle moves through different environments but the long view image 46 and the short wide angle view image 50 will each represent the same respective areas in the field of view 22 to the rear of the vehicle 14.

Referring now to FIG. 4, a block diagram of the display system 10 is shown. The first imager 18 and the second imager 26 are shown in communication with the controller 42. A pixel array of the first and second imager 18, 26 may correspond to a CMOS image sensor, for example a CMOS active-pixel sensor (APS) or a charged couple device (CCD). Each of the pixels of the pixel array may correspond to a photo sensor, an array of photo-sensors, or any grouping of sensors configured to capture light. The controller 42 may comprise a processor 82 operable to process the image data as supplied in analog or digital form from the first and second imagers 18, 26. In various embodiments, the processor 82 may be implemented as a plurality of processors, a multicore processor, or any combination of processors, circuits, and peripheral processing devices.

The controller 42 may further include a memory 86. The memory 86 may include various forms of memory, for example, random access memory (RAM), dynamic RAM (DRAM), synchronous DRAM (SDRAM), and other forms of memory configured to store digital information. The memory 86 may be configured to store the image data for processing. Processing the image data may include scaling and cropping the image data to adjust a position and apparent size of the image data as it is output to a screen of the first and second display devices 30, 38. In some embodiments, the memory 86 may further be configured to store a plurality of user profiles, each corresponding to a specific desired view that may be recalled in relation to a particular operator of the vehicle 14.

The controller 42 may further be in communication with a plurality of inputs for example, a speed input 90, a proximity sensor input 94, and a vehicle bus input 98. The speed input 90 may provide a signal communicating a speed of the vehicle 14 via a speedometer or any device operable to measure and communicate data corresponding to the speed of the vehicle 14. The proximity sensor input 94 may be configured to receive signals from one or more of the proximity sensors to adjust the desired view of the image data within the field of view 22. The vehicle bus 98 may be implemented using any suitable standard communication bus, such as a Controller Area Network (CAN) bus, a Local Interconnect Network (LIN) bus, etc. The vehicle bus 98 may be configured to provide a variety of additional information to the controller 42. Such information may correspond to one or more vehicle states, for example a gear selection, passenger occupancy, a headlight activation, the steering wheel position, etc.

Figure 5:
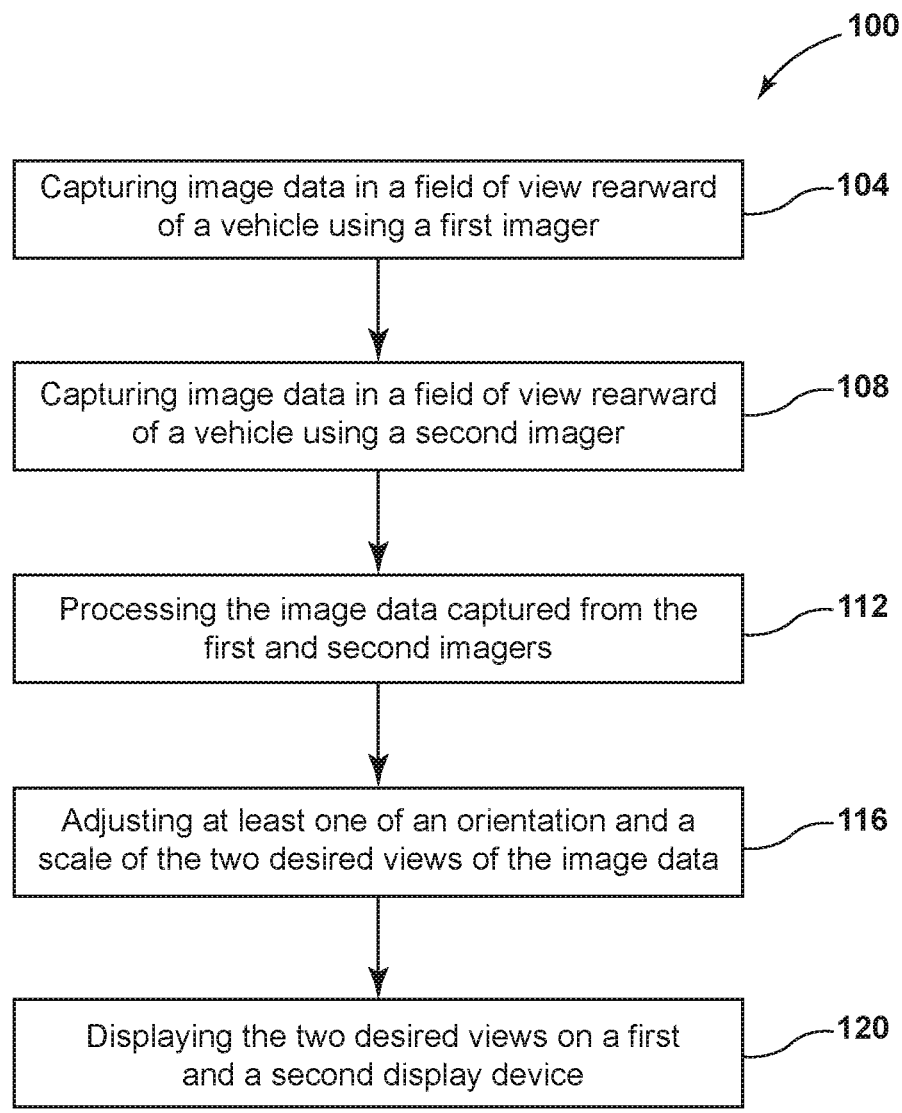
FIG. 5 is a schematic flow diagram illustrating a method for simultaneously displaying two desired views of the image data according to some embodiments of the present disclosure.

Referring now to FIG. 5, a method 100 for simultaneously displaying two or more desired views of image data in the vehicle 14 is provided. The method 100 includes capturing image data in the field of view 22 rearward of the vehicle 14 using the first imager 18 (step 104) and capturing image data in the field of view 22 rearward of the vehicle using the second imager 26 (step 108). The method 100 further includes processing the image data captured from the first and second imagers 18, 26 (step 112) and adjusting at least one of an orientation and a scale of the two desired views of the image data (step 116). Lastly, the method 100 includes displaying the two desired views on the first and second display devices 30, 38 (step 120). In some embodiments, the method may further include capturing image data complementary and/or different from the field of view rearward of the vehicle using one or more supplemental imagers (not shown).

In some embodiments, the long view image 46 and the short wide angle view image 50 may partially overlap to provide a continuous view of the image data collected in the field of view 22. In these embodiments, overlapping the long and short wide angle view images 46, 50 may be optimized to help eliminate blind spots for the user and offer a continuous field of view 22 in a readily accessible manner. In other embodiments, the long view image 46 and the short wide angle view image 50 may not overlap the image data at all so the field of view 22 may offer greater and/or different perspectives provided by the first and second imagers 18, 26. In still other embodiments, the controller 42 could be configured to crop different portions of the image data collected from the first and second imagers 18, 26 and display two or more desired images on the first and second display devices 30, 38. By using the controller 42 to process different or varying portions of the collected image data, the display system 10 can provide flexibility to the user in determining how the field of view 22, blind spots, objects, and the general surroundings are presented on the first and second display devices 30, 38.

The disclosed display system and method for simultaneously displaying two or more desired views of image data in the vehicle 14 is able to eliminate blind spots in the images displayed inside the vehicle 14 to the driver and/or occupants. Prior attempts to eliminate blind spots was based on physically moving the available imager or imagers to obtain a field of view having no blind spots. Alternatively, using the currently disclosed method, the display system 10 is able to strategically overlap the image data from the corresponding field of views using the first and second imagers 18, 26 using the controller 42 rather than a physical or mechanical alignment. The ability to effectively and efficiently convert the vehicle's 14 surroundings to one or more images displayed on one or more display devices gives the driver and/or the occupants more data to safely maneuver through their surroundings. In addition to the controller 42 being able to adjust the image data from the corresponding field of views using the first and second imagers 18, 26, in some embodiments, the first and second imagers 18, 26 may be able to modify and adjust the image data collected through focusing and detection features.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is a display system for a vehicle comprising: a first imager configured to capture image data in a field of view rearward of the vehicle; a second imager configured to capture image data in the field of view rearward of the vehicle; a first display device disposed in a passenger compartment of the vehicle; a second display device disposed in the passenger compartment of the vehicle; and a controller in communication with the first and second imagers and the first and second display devices wherein the controller produces two desired views of the image data for display on the first and second display devices.

The display system of Embodiment A wherein the first display device is a rearview mirror display device.

The display system of Embodiment A or Embodiment A with any of the intervening features wherein the second display device is a dash display device.

The display system of Embodiment A or Embodiment A with any of the intervening features wherein the first and second display devices are both positioned in a rearview mirror display device or a dash display device.

The display system of Embodiment A or Embodiment A with any of the intervening features wherein the desired view of the image data from the first imager is displayed on the first display and the desired view of the image data from the second imager is displayed on the second display.

The display system of Embodiment A or Embodiment A with any of the intervening features wherein the image data captured from the first imager corresponds to a long view image and the image data captured from the second imager corresponds to a short wide angle view image.

The display system of Embodiment A or Embodiment A with any of the intervening features further comprising: one or more supplemental imagers configured to capture image data in a field of view complementary and/or different from the field of view rearward of the vehicle; and one or more supplemental display devices disposed in the passenger compartment of the vehicle.

The display system of Embodiment A or Embodiment A with any of the intervening features further comprising: one or more supplemental imagers configured to capture image data in a field of view complementary and/or different from the field of view rearward of the vehicle.

The display system of Embodiment A or Embodiment A with any of the intervening features further comprising: one or more supplemental display devices disposed in the passenger compartment of the vehicle.

The display system of Embodiment A or Embodiment A with any of the intervening features wherein the first and second imagers may be positioned on or within a side view mirror, a rearview display device, a rear windshield, a front windshield, one or more doors, a bumper, a trunk, a paneling member, or combinations thereof.

The display system of Embodiment A or Embodiment A with any of the intervening features wherein the one or more supplemental imagers may be positioned on or within a side view mirror, a rearview display device, a rear windshield, a front windshield, one or more doors, a bumper, a trunk, a paneling member, or combinations thereof.

Embodiment B is a method for simultaneously displaying two desired views of image data, the method comprising: capturing image data in a field of view rearward of the vehicle using a first imager; capturing image data in the field of view rearward of the vehicle using a second imager; processing the image data captured from the first and second imagers; and displaying the two desired views on a first and a second display device.

The method of Embodiment B further comprising displaying the desired view of the image data collected from the first imager on the first display device; and displaying the desired view of the image data collected from the second imager on the second display device.

The method of Embodiment B or Embodiment B with any of the intervening features wherein the first display device is a rearview mirror display device and the second display device is a dash display device.

The method of Embodiment B or Embodiment B with any of the intervening features wherein the first and second display devices are both positioned in a rearview mirror display device or a dash display device.

The method of Embodiment B or Embodiment B with any of the intervening features wherein the image data captured from the first imager corresponds to a long view image and the image data captured from the second imager corresponds to a short wide angle view image.

The method of Embodiment B or Embodiment B with any of the intervening features further comprising: capturing image data complementary and/or different from the field of view rearward of the vehicle using one or more supplemental imagers.

Embodiment C is an apparatus for displaying a rearward directed field of view for a vehicle, the apparatus comprising: a display device disposed in a passenger compartment of the vehicle, the display device comprising a first and a second screen; and a controller in communication with the display device and a first imager and a second imager configured to capture image data in the rearward directed field of view, wherein the controller is operable to process the image data and produce two desired views of the image data.

The apparatus of Embodiment C wherein the display device is a rearview mirror display device or a dash display device.

The apparatus of Embodiment C or Embodiment C with any of the intervening features further comprising: one or more supplemental imagers configured to capture image data in a field of view complementary and/or different from the field of view rearward of the vehicle.

The display system of Embodiment C or Embodiment C with any of the intervening features further comprising: one or more supplemental display devices disposed in the passenger compartment of the vehicle.

The apparatus of Embodiment C or Embodiment C with any of the intervening features wherein the image data captured from the first imager corresponds to a long view image and the image data captured from the second imager corresponds to a short wide angle view image.

What is claimed is:

1. A display system for a vehicle comprising:
   a first imager positioned on or within an antenna housing disposed centrally on the vehicle and coupled to a roof of the vehicle, the first imager configured to capture a first set of image data in a first field of view rearward of the vehicle;
   a second imager positioned centrally on the vehicle below a bumper and vertically spaced from the first imager, the second imager configured to capture a second set of image data in a second field of view rearward of the vehicle, wherein the first field of view does not overlap with the second field of view;
   a first display device disposed in a passenger compartment of the vehicle, the first display device comprising a rearview mirror display device positioned within the compartment;
   a second display device disposed in the passenger compartment of the vehicle, the second display device comprising a center stack display device vertically aligned with and disposed below the first display device; and
   a controller in communication with the first and second imagers and the first and second display devices wherein the controller simultaneously outputs a first view of the first set of image data, which corresponds to a long view, for display on the first display device and a second view of the second set of image data, which corresponds to a short wide angle view, for display on the second display device.

2. The display system of claim 1, wherein the antenna housing is disposed on an exterior panel of the roof.

3. The display system of claim 1, further comprising:
   one or more supplemental imagers configured to capture image data in a field of view complementary and/or different from one of the first field of view and the second field of view rearward of the vehicle; and
   one or more supplemental display devices disposed in the passenger compartment of the vehicle.

4. The display system of claim 1, further comprising:
   one or more supplemental imagers configured to capture image data in a field of view complementary and/or different from one of the first field of view and the second field of view rearward of the vehicle.

5. The display system of claim 4, wherein the one or more supplemental imagers are positioned on or within a side view mirror, a rearview display device, a rear windshield, a front windshield, one or more doors, a bumper, a trunk, a paneling member, or combinations thereof.

6. A method for simultaneously displaying two views of image data, the method comprising:
   capturing a first set of image data in a first field of view directed centrally rearward relative to a vehicle using a first imager;
   capturing a second set of image data in a second field of view directed centrally rearward relative to the vehicle using a second imager vertically spaced from the first imager, the second imager positioned at least partially below a bumper, wherein the first field of view is aimed above the second field of view and the first and second fields of view are free of overlapping;
   processing the image data captured from the first and second imagers, including at least one of scaling and orienting the image data; and
   displaying the two views on a first display device and a second display device, wherein the first display device is a rearview mirror display device and the second display device is a dash display device positioned centrally in a passenger compartment of the vehicle.

7. The method of claim 6, further comprising:
   displaying the view of the first set of image data collected from the first imager on the first display device; and
   displaying the view of the second set of image data collected from the second imager on the second display device.

8. The method of claim 6, wherein the first set of image data captured from the first imager corresponds to a long view image and the second set of image data captured from the second imager corresponds to a short wide angle view image.

9. The method of claim 6, further comprising:
   capturing image data complementary and/or different from one of the first field of view and the second field of view rearward of the vehicle using one or more supplemental imagers.

10. An apparatus for displaying rearward directed fields of view for a vehicle, the apparatus comprising:
    a display device disposed in a passenger compartment of the vehicle, the display device comprising a first screen and a second screen; and a controller in communication with the display device and a first imager and a second imager, the first imager configured to capture image data in a first rearward directed field of view aligned with a central longitudinal axis of the vehicle and the second imager positioned below a bumper of the vehicle and configured to capture image data in a second rearward directed field of view aligned with the central longitudinal axis of the vehicle, wherein the second field of view corresponds to a short wide angle view and is different from the first field of view and the controller is operable to process the image data and simultaneously output first and second views of the image data to the first screen and the second screen, wherein the first screen is a rearview mirror display device and the second screen is a dash display device positioned centrally in the passenger compartment of the vehicle.

11. The apparatus of claim 10, further comprising:
one or more supplemental imagers configured to capture image data in a field of view complementary and/or different from one of the first and second fields of view rearward of the vehicle; and
one or more supplemental display devices disposed in the passenger compartment of the vehicle.

12. The apparatus of claim 10, wherein the first imager is positioned on or within an antenna housing coupled to an exterior panel of a roof of the vehicle.

\* \* \* \* \*